July 12, 1927.
N. C. FRIKKE
1,635,210
STEERING GEAR BRAKE
Filed Aug. 25, 1924
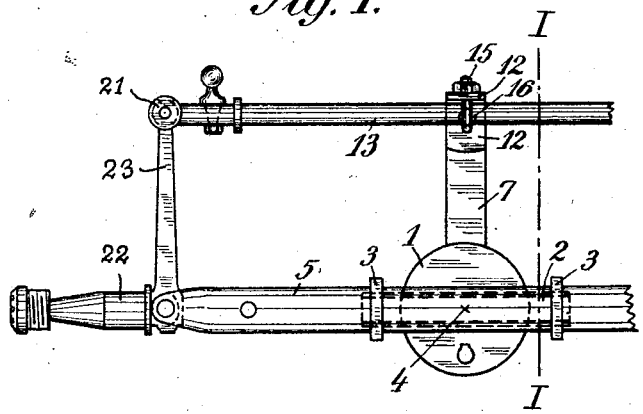
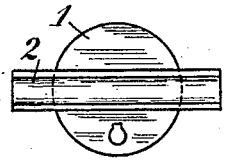
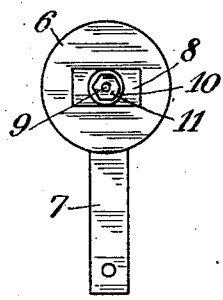
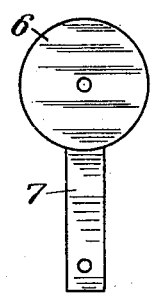
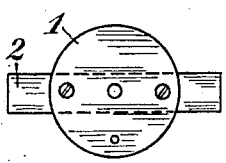
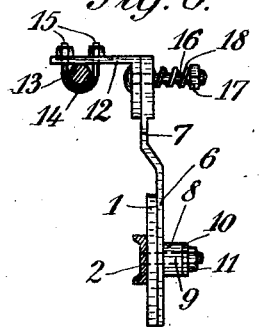

Patented July 12, 1927.

1,635,210

UNITED STATES PATENT OFFICE.

NIS CHRISTIAN FRIKKE, OF ESBJERG, DENMARK.

STEERING-GEAR BRAKE.

Application filed August 25, 1924, Serial No. 734,053, and in Denmark March 17, 1924.

It is a fact generally known to motorists that, although the steering wheel may be held rigidly, the front wheels may nevertheless suddenly commence to stagger. This will more frequently occur with somewhat used and worn cars and especially when driving at a certain, mostly slow speed. While the car is driving straight ahead the front wheels will begin to stagger and wabble in a peculiar, regular manner and the driver will find himself quite unable to prevent this or even find the reason for it. Sometimes it will be possible to avoid this trouble by changing the speed of the car, but often even this will not be possible.

It is the object of the present invention by the provision of suitable means to obviate this trouble.

The invention consists therein that a steering gear brake is provided which will steady the front wheels so that they will run evenly and quietly, thereby affording a greater safety and reliability in the steering of the car. The steering gear brake is fitted to the front axle of the car, or some other suitable part of the same and consists of a movable arm being secured to the rod coupling the two steering knuckles. This arm is in a suitable manner attached to a friction brake so that it will oppose any staggering of the wheels, but will not prevent the intentional steering movement. By the use of a steering gear brake according to the present invention the wear of the various steering members will be greatly reduced, whereas the steering gear itself shows a very small wear.

In the accompanying drawing a constructional form of the steering gear brake according to the present invention is shown by way of example.

Fig. 1 is a top view of the one end of the steering gear of a motor car with the steering gear brake fitted to the same.

Fig. 2 is a top view of the upper brake disc.

Fig. 3 is a view showing the underside of the lower brake disc.

Fig. 4 is a top view of the lower brake disc.

Fig. 5 is a view of the underside of the top brake disc.

Fig. 6 is a side view of the brake according to Fig. 1.

In the constructional form shown by way of example the numeral 1 indicates a circular disc, Figs. 2 and 5, to which is secured a transverse rail 2. This rail is clamped by suitable straps 3, bolts and nuts to the front axle 5. In the drawing, Fig. 1, the disc 1 is so secured that its center coincides with the middle of the said front axle.

Beneath said disc 1 is disposed a second disc 6, Figs. 3 and 4, provided with an arm 7 extending therefrom. These discs 1 and 6 are held against each other by means of a bolt 9 passing through their centers, and through an arched spring 8, Fig. 6, whereupon it is secured by means of a nut 11 and washer 10. For preventing a loosening of the nut 11, the latter may be secured by means of a split pin.

To the outer end of arm 7 is attached an angle 12 in such a manner that it can slightly swivel thereon, namely by means of a bolt 16 and a nut 17, a coiled spring 18 being disposed between said nut 17 and the arm 7.

The other end of said angle 12 is provided with stirrups 14 carrying nuts 15 on their ends, and adapted to be passed around the rod 13 coupling the steering knuckles, and to be tightened thereon by means of the said nuts 15.

When the car is running, and in case the gear-wheels, worm-gear or the like by which the steering operation is transmitted from the steering wheel to the steering gear, is worn so that there exists some play in them, the front wheels are inclined to stagger or wabble. This staggering will be prevented by the friction between the two said discs, such friction being adjusted by means of the nut 11 to a suitable degree. The discs 1 and 6 are, however, not tightened so much against each other that the friction produced will be great enough to prevent the transmission of the steering movements.

I claim:

Steering gear brake for use with automobiles and other vehicles consisting of a brake member fitted to the front axle, another brake member, frictionally movable on said first brake member, a spring pressing the said two brake members together, the movable brake member having an arm, an angular member clamped to the steering rod of the steering gear, said angular member being secured to the free end of the arm of the movable brake member by means of a bolt and nut passing through the said two parts and having a coiled spring under the said nut.

In witness whereof he affixes his signature.

NIS CHRISTIAN FRIKKE.